Patented Oct. 17, 1922.

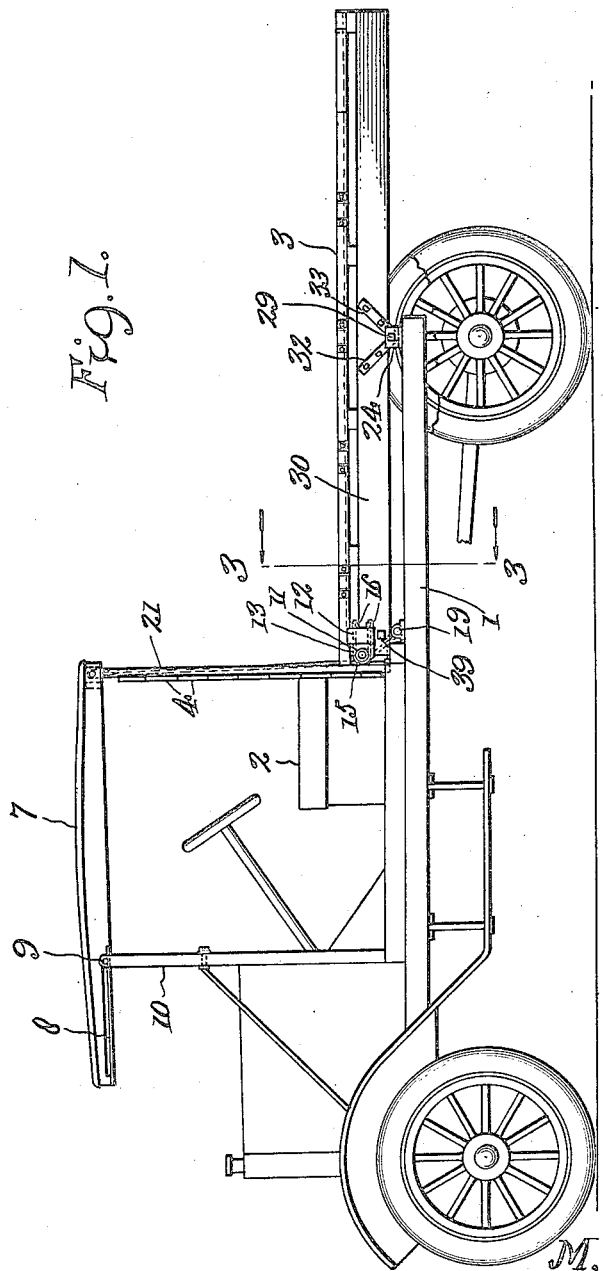

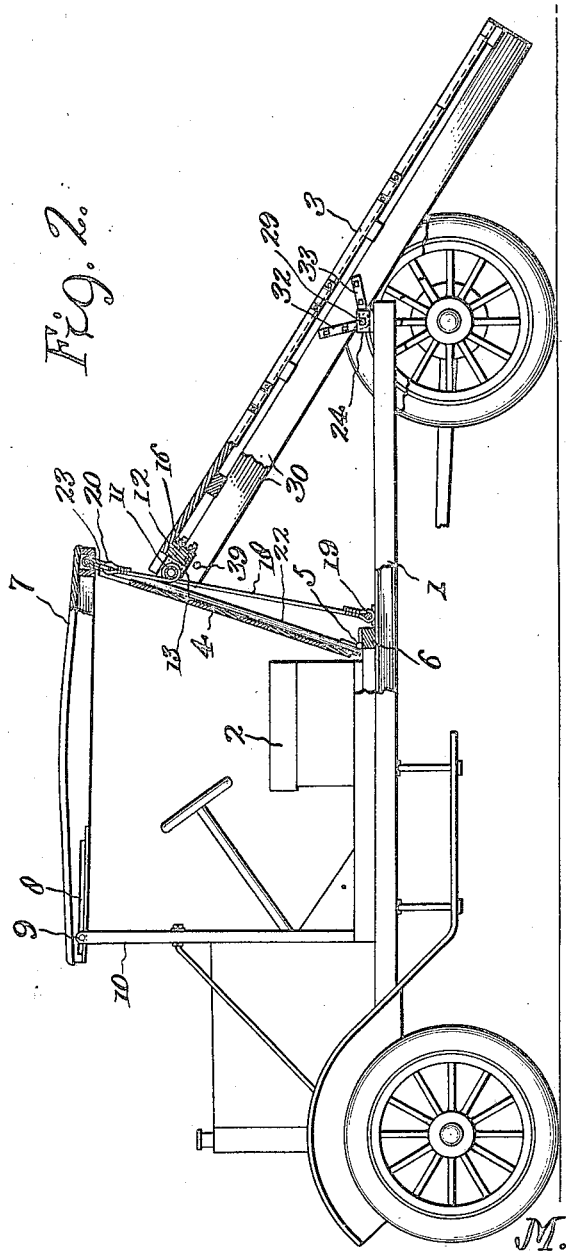

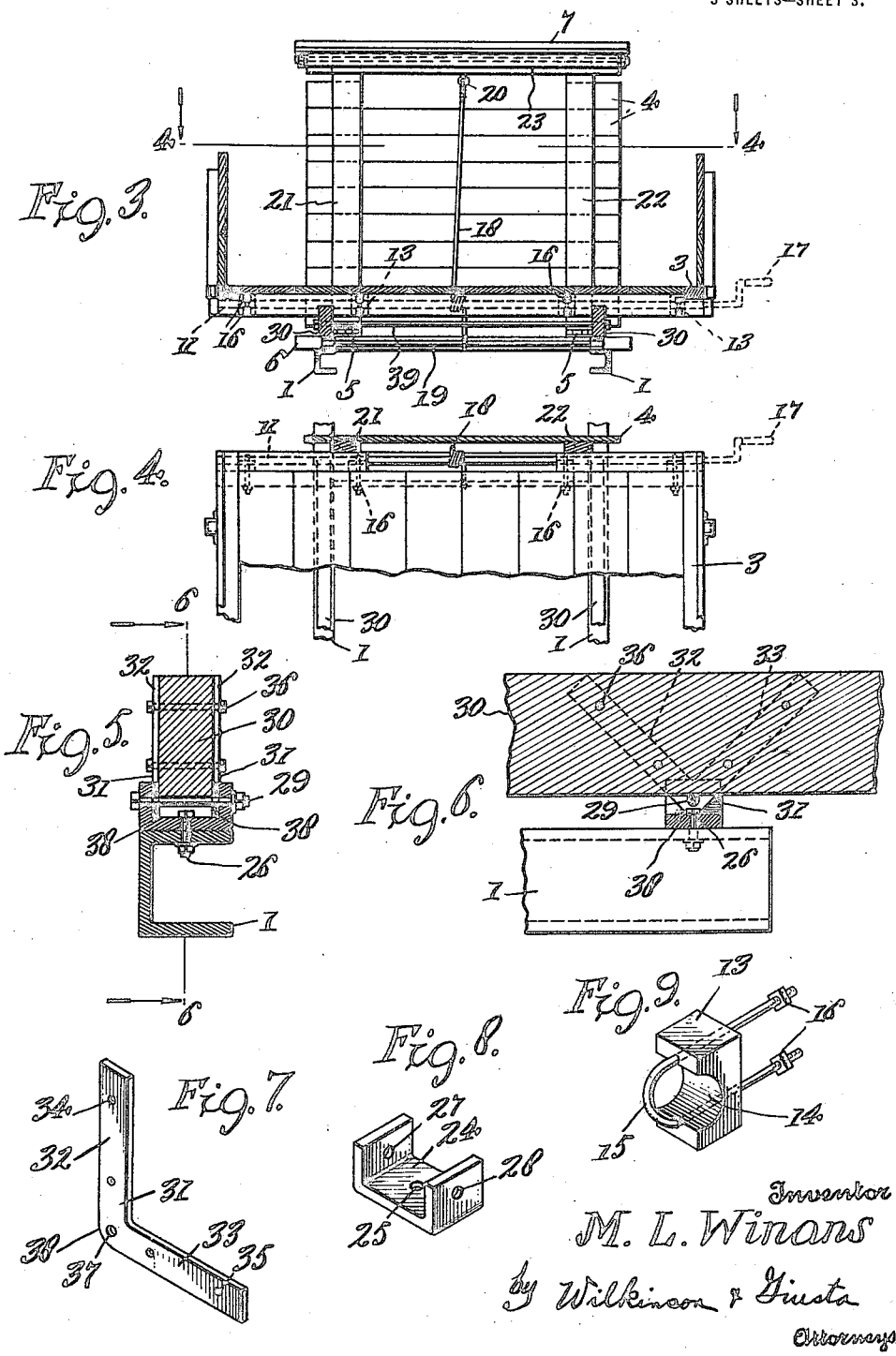

1,432,313

UNITED STATES PATENT OFFICE.

MYRON L. WINANS, OF WACO, TEXAS.

DUMPING AUTO BODY.

Application filed August 1, 1921. Serial No. 488,966.

*To all whom it may concern:*

Be it known that I, MYRON L. WINANS, a citizen of the United States, residing at Waco, in the county of McLennan, in the State of Texas, have invented certain new and useful Improvements in Dumping Auto Bodies; and I do hereby declare the following to be a full, clear, and exact description of the invention, such as will enable others skilled in the art to which it appertains to make and use the same.

The present invention relates to improvements in dumping auto bodies, and has for an object the provision of a simply constructed and inexpensive dumping body for vehicles in which simplicity of operation is combined with strength of parts.

Another object of the invention lies in providing an improved pivotal support for the dump body in, which a minimum of friction will be encountered by reason of the small bearing surfaces, which at the same time is sturdy and will sustain without likelihood of breakage, heavy loads which are ordinarily carried on automobile trucks.

A further object of the invention resides in certain improvements in the truck cab in conjunction with the dumping body and in the operating device for raising and lowering the body in conjunction with the cab.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a side view of an improved truck or vehicle having a dump body and cab constructed according to the present invention;

Fig. 2 is a similar view with parts broken away showing the body in the dumping position;

Fig. 3 is a sectional view taken on the line 3—3 in Fig. 1;

Fig. 4 is a similar view taken on the line 4—4 in Fig. 3;

Fig. 5 is a cross sectional view on an enlarged scale through one of the bearings in the dump body;

Fig. 6 is a section taken on the line 6—6 in Fig. 5;

Fig. 7 is a perspective view of one of the bearing plates;

Fig. 8 is a similar view of a bearing clip; and,

Fig. 9 is one of the blocks for supporting the operating shaft.

Referring more particularly to the drawings, 1 designates generally a vehicle or automobile truck of a conventional form, and 2 the driver's seat which is located in a compartment forwardly of the body and generally in a cab which houses it about. The dumping body 3 in the present instance is pivoted intermediately of its ends upon the rear portion of the truck or vehicle 1 and is adapted to swing for instance to the position shown in Fig. 2 in the act of dumping its load.

Forwardly of the body 3 is a partition 4 which forms the back of the cab and separates the latter from the dump body. The partition 4 is hinged at 5 to a transverse beam 6 extending across the vehicle and at its upper end the partition 4 extends to and is connected with the roof 7 of the cab. Slots 8 are provided at the forward side portions of the roof 7 to slidably receive a rod 9 carried by the windshield brackets 10. The body is adapted to be raised and lowered by the turning of a shaft 11 which is rotatably mounted at the lower portion of the dump body 3.

At this portion of the dump body a transverse beam 12 is located, upon which a number of blocks 13 are mounted at the forward side thereof having concavities 14 of a size to fit about a portion of the shaft 11. This shaft 11 is preferably of hollow piping and is held in the concavities 14 by the use of U shaped bolts 15. These bolts extend through the blocks 13 and are of sufficient length to pass also through the beam 12. The bolts therefore serve the double function of clamping the shaft 11 in place and supporting the shaft and blocks 13. Nuts 16 are run on the free ends of the bolts 15 to clamp the same in place. As many of the blocks as are necessary may be used, but I find that four such blocks are adequate to take care of the strain incident to the support and turning and lifting movements of the shaft 11.

The shaft 11 is squared at one end to receive a crank 17 indicated in Figs. 3 and 4 by which manual rotation is imparted to the shaft when the body is to be raised and lowered.

A flexible cable 18 is wound at an intermediate portion about the shaft 11, being given several turns thereabout. One end of the cable 18 is carried downwardly and secured permanently as at 19 to a stationary part of the vehicle 1. The upper end of the cable is secured as indicated at 20 to the partition 4 at its upper portion. The partition, as indicated more particularly in Fig. 3, is made up of a number of boards which are numbered 4, one above another, being secured to cleats 21 and 22, and a transverse rail 23 is secured at the top of the partition to which the cable is secured.

Referring more particularly to Figs. 5 to 8 inclusive, the dump body is shown to be supported pivotally in U shaped bearing supports or clips 24, having perforations 25 in their bases to receive bolts 26 by which the clips are secured to the upper flanges of the channel beams of the vehicle 1. These clips 24 are further provided with aligned openings 27 and 28 in their out-standing flanges to receive a pin or bolt 29 upon which the lower edges of the rails 30 of the dump body directly rest.

These rails do not descend fully into the clips 24, but only upon the pins 29 upon which they have a rounded support which facilitates the rocking movement of the vehicle body into and out of closed position.

At each side of each rail 30 of the dump body is placed a bearing plate 31 of V shaped metal having arms 32 and 33 diverging upwardly and provided with perforations 34 and 35 to receive bolts or other fastenings 36 by which the arms are secured together upon the sides of the rails 30. The angled portions of the V shaped bearing plates extend beyond the lower edges of the rails 30 and have registering apertures 37 to receive the pins 29. The lowermost edges of the plates 31 are rounded as indicated at 38.

In operation, the crank 17 is applied to the shaft 11 and it is turned, thus taking up the cable at one side and slackening it at the opposite side. It will thus be seen that the body is either raised or lowered. In the raising movement of the body, the lower portion of the cable 18 is payed out, while the upper portion is drawn downwardly, thus raising the body, or in other words, the shaft 11 is made to climb upwardly in the cable 18. This is accompanied by a swinging movement of the partition 4 rearwardly, as shown in Fig. 2, and in case a roof 7 is present on the cab, which however is not necessary, such roof will slide backwardly as shown in Fig. 2, without at the same time exposing any portion of the cab within.

The movement of the crank 17 will be reversed to restore the dump body to the position shown in Fig. 1 and the attached members will also be returned to their normal positions.

In executing this movement, the dump body 3 turns upon the comparatively thin bearing plates 31 which form a turning support of small frictional area and therefore the movement of the body is executed with little difficulty. The V character of the supporting plates 31 is such as to add strength, and the relative position of the clips 24 in conjunction with the arms and the rails 30 and pins 29 constitutes a rigid construction. The truck body 3 is also constructed in any suitable fashion, but it is preferred that a tie rod 39 be connected there-across at the point indicated for the purpose of securing the side rails and other longitudinal parts against spreading.

It is obvious that various changes and modifications may be made in the details of construction and design of the above specifically described embodiment of this invention without departing from the spirit thereof, such changes and modifications being restricted only by the scope of the following claims:

What is claimed is:

1. In a vehicle, a movable dump body, a swinging partition mounted on the vehicle, and means for raising and lowering the dump body, said means being connected to the vehicle and to said swinging partition, substantially as described.

2. In a vehicle, a dump body pivoted intermediate its length upon the rear portion of the vehicle, a partition pivoted at its lower end on the vehicle forwardly of the dump body, and means connected at its opposite ends to the vehicle and to the free portion of the partition and intermediately to the forward free edge of the dump body for raising and lowering the latter, substantially as described.

3. In a vehicle, a dump body pivoted thereon, a partition pivoted on the vehicle forwardly of the dump body, a flexible cable attached at one end to the vehicle and at its other to the partition and having means to connect it intermediately to the forward end of the dump body, substantially as described.

4. In a vehicle, a dump body, a movable partition forwardly thereof, a rotating shaft carried by the dump body, a cable wound at its intermediate portion about the shaft and having its ends attached respectively to the vehicle and to such partition, substantially as described.

5. In a vehicle, a movable dump body, blocks carried at the forward portion thereof with rounded concavities, U bolts for supporting said blocks upon the body and having their intermediate portions constituting bearings with the block concavities, a shaft mounted in the concavities between the blocks and U shaped bolts and rotatable therein, a movable partition forwardly of the body, and a flexible cable wound at an intermediate portion about the shaft and having its ends attached respectively to the vehicle and to said partition, substantially as described.

6. In a vehicle, a movable dump body, a movable partition forwardly thereof, a cab top slidably mounted on the vehicle and connected to the partition, and means connected to the partition and vehicle and intermediately to the body for raising and lowering the latter, substantially as described.

MYRON L. WINANS.